Patented Feb. 6, 1951

2,540,284

UNITED STATES PATENT OFFICE 2,540,284

CHROMATOGRAPHIC PURIFICATION OF STREPTOMYCIN AND STREPTOTHRICIN HYDROCHLORIDE

Robert L. Peck, Plainfield, N. J., assignor to Merck & Co., Inc., Rahway, N. J., a corporation of New Jersey No Drawing. Application June 23, 1945, Serial No. 601,337

6 Claims. (Cl. 167—65)

This invention relates to the purification of therapeutically valuable antibiotic substances, and particularly to the purification of water-soluble basic antibiotic substances obtained by cultivation of strains of micro-organisms of the genus Actinomyces in suitable culture medium.

It has been shown that antibiotic substances of this type such as streptothricin (Waksman and Woodruff; Proceedings of the Society for Experimental Biology and Medicine 49, 207–210 (1942)) and streptomycin (Schatz, Bugie, and Waksman; Proceedings of the Society for Experimental Biology and Medicine 55, 66–69 (1944)) can be isolated from culture media as crude hydrochloride salts. In a pending application of A. Walti, Serial No. 577,143, filed February 9, 1945, now Patent No. 2,481,267 issued September 6, 1949, a process is disclosed for obtaining crude lower aliphatic carboxylic acid salts of streptothricin and streptomycin by adsorbing streptothricin or streptomycin from culture media on activated charcoal and eluting the adsorbate with a dilute solution of a lower aliphatic carboxylic acid.

The acid salts of streptothricin and streptomycin obtained by the methods referred to above are crude concentrates having low potency or activity and containing admixed organic and inorganic impurities. Such crude concentrates are not particularly suitable for therapeutic administration because the low potency requires use of large quantities of the crude materials to provide an effective therapeutic dose; and further because the extraneous materials present in the concentrates may cause undesired physiological reactions.

In an application by Graber and Peck filed concurrently herewith Serial No. 601,338, filed June 23, 1945, now abandoned, a process is disclosed for preparing, from the crude concentrates above mentioned, picric acid salts of the Actinomyces elaboration products which can be isolated in essentially pure form and/or converted to mineral acid salts having a markedly increased potency as compared with the original concentrates.

It is now discovered in accordance with the present invention that antibiotics of the type above mentioned, including crude concentrates, picric acid salts, mineral acid salts, and the like, of Actinomyces elaboration products can be purified by selective adsorption and elution thereof with a resulting increase in potency of the order of 1½–3 or more times the potency of the material so treated. Thus, for example, a crude concentrate of streptothricin hydrochloride having an activity of about 49 units/mg. when treated in accordance with the present process yields streptothricin hydrochloride having an activity of about 131 units/mg.; similarly a portion of purified streptomycin hydrochloride having an activity of about 354 units/mg. when treated in accordance with the present process yields streptomycin hydrochloride having an activity of about 720 units/mg. (A unit of activity is that amount of material which will inhibit the growth of a standard strain of *Escherichia coli* in one ml. of a suitable culture medium.)

Regarded in certain of its broader aspects, the novel process according to the present invention, comprises adsorbing an antibiotic substance of the class consisting of acid salts of Actinomyces elaboration products on an adsorbent material, preferably in a column of the chromatographic type, washing the adsorbent material with solvent to develop in the column zones of adsorbent material containing the antibiotic substance in differing amounts and differing degrees of purity, and selectively recovering the antibiotic substance from said zones of adsorbent material.

Various adsorbents can be utilized in the practice of this invention including charcoal, acid washed charcoal, alumina, acid washed alumina, diatomaceous silica and the like; acid washed charcoal and acid washed alumina being preferred adsorbents. The adsorbent is preferably arranged in a column of the chromatographic type, and in certain instances as in the case of the picric acid salts of streptothricin and streptomycin which have characteristic yellow colors, a true chromatograph is developed during the process. If desired, the rate of flow of eluting solvent can be modified by adding a material such as filter paper pulp to the adsorbent.

In preparing an acid washed adsorbent of the preferred type, the adsorbent such as aluminum oxide is treated with sulfuric acid and then washed with water until the pH of the washings is about 4.5. The adsorbent is then dried at elevated temperature. A column is then packed with an amount of adsorbent within the range of about 10–30 grams of adsorbent for each gram of acid salt of the antibiotic to be treated. The column is preferably wet packed, by filling with the adsorbent and the solvent to be used in elution and then allowing the solvent to drain out until the layer of solvent on the adsorbent is approximately 1–2 mm.

The acid salt of the antibiotic is then dissolved in a suitable solvent, for example methanol, to form a concentration of about 10–50% and the solution is poured on to the upper surface of the adsorbent in the column and allowed to flow into the adsorbent either by gravity or under pressure. When the solution of the antibiotic substance is all in the adsorbent, fresh solvent, not necessarily the same as that originally used, is added to the top of the column and allowed to percolate through either by gravity or under slight pressure. The eluate thus obtained is tested from time to time for presence of solids by the addition of a few drops of the eluate to about 5 cc. of acetone or ether. If solids are present in the eluate, a precipitate of the solid material is formed. After solids appear in the eluate various fractions of eluate are collected at arbitrary or predetermined intervals. When by virtue of color or the adsorbate, or by other means, it is possible to determine chromatographic bands present in the column determination of the fractions of eluate to be collected is facilitated by the movement of the bands downwardly in the column. When it is impossible to visually or otherwise detect these bands or zones of different composition, an empirical guide as to the fractions of eluate to be collected can be readily worked out for any particular antibiotic substance to be treated by making a few preliminary runs, collecting fractions of eluate at arbitrary intervals and determining the amounts of the desired product in the various fractions. The antibiotic substance is isolated from the collected fractions of eluate, either separately or combined, by partially concentrating fractions and pouring the same into a miscible solvent in which the antibiotic is immiscible, such as acetone, ether, mixtures of acetone and ether, or the like, causing precipitation of the antibiotic acid salt. The precipitate is then removed and freed of solvent and impurities by conventional procedures.

An alternate procedure for obtaining separate fractions from the column is to free the column of solvents, divide the adsorbent into separate sections, known or determined to contain optimum or predominant amounts of antibiotic substances, and then to extract the sections separately with a suitable solvent and precipitate the antibiotic substance in the manner previously described.

The distribution of bands or sections of adsorbed antibiotic substance in the column differs depending upon the acid salts being purified. For example in selectively adsorbing and eluting streptothricin salts such as streptothricin hydrochloride, the first fractions of eluate or the lower zones, bands or sections of the column usually contain large amounts of inorganic salt contaminants and later fractions of eluate or higher bands or sections of the column contain predominant amounts of the streptothricin salt. In the case of streptomycin salts, such as streptomycin hydrochloride, the purer salt is generally found in early fractions of eluate or in lower bands or sections of the adsorbent column.

The solvent media used for developing the zones or bands of different composition in the column of adsorbent include generally water and those organic solvents, or solvent mixtures in which acid salts of Actinomyces elaboration products are soluble. These acid salts are most soluble in solvents such as water, lower aliphatic alcohols, and mixtures thereof, and solvents of this type are therefore generally used in elution. It is sometimes advantageous in the adsorption step however, to employ a solvent medium in which the acid salt is not too readily soluble in order that better distribution of adsorbate in the column can be obtained before any appreciable amount of the acid salt passes from the column. For this purpose, mixtures of water or a lower aliphatic alcohol with acetone, chloroform, or the like, can be employed.

It will be understood that the degree of purity or potency of the antibiotic acid salts will depend in large measure upon the care taken in determining the amounts of the different fractions of eluate to be collected or similarly the particular manner in which a column of adsorbent with adsorbed antibiotic substance is divided for subsequent extraction of separate parts thereof. It will further be understood that by subjecting antibiotic acid salts recovered from the various eluate fractions to additional selective adsorption and elution treatment, additional amounts of products of high potency can be obtained. Each time that an antibiotic acid salt is treated in accordance with the process of the present invention, a portion of the total activity of the order of 50% of that present in the material so treated is recovered in product having a unit potency 1½–2½ or more times the unit potency of the material treated.

The following examples illustrate methods of carrying out the present invention, but it is to be understood that these examples are given by way of illustration and not of limitation.

*Example 1*

About 10 grams of streptothricin hydrochloride having an activity of approximately 49 units/mg. is dissolved in about 30 cc. of methanol and the solution is adsorbed on about 160 grams of acid washed alumina in a column of the chromatographic type. Methanol is then passed through the column and a number of fractions of eluate are collected and separately vacuum concentrated to small volume and mixed with a mixture of ether and acetone to cause precipitation of the streptothricin hydrochloride. The precipitated product from each fraction is freed of solvent, dried and tested for activity. The following table summarizes the data on the various fractions of eluate collected, and streptothricin hydrochloride obtained therefrom:

| Fractions | | Weight of solid, gms. | Activity, Units/mg. | Per cent of Original Activity |
|---|---|---|---|---|
| No. | Vol./ml. | | | |
| 1 | 119 | ¹ 1.598 | less than 5 | 0 |
| 2 | 29 | 0.705 | 22 | 4 |
| 3 | 30 | 0.762 | 64 | 10 |
| 4 | 32 | 0.547 | 106 | 12 |
| 5 | 58 | 0.644 | 119 | 16 |
| 6 | 51 | 0.362 | 104 | 8 |
| 7 | 50 | 0.265 | 111 | 6 |
| 8 | 86 | 0.327 | 113 | 8 |
| 9 | 17 | 0.049 | 123 | 1 |
| 10 | 105 | 0.281 | 101 | 6 |
| 11 | 100 | 0.160 | 92 | 3 |
| 12 | 83 | 0.116 | 84 | 2 |
| 13 | 80 | 0.095 | 70 | 1 |
| 14 | 189 | 0.178 | 92 | 3 |
| Total | | | | 80 |

¹ Mainly inorganic salts.

*Example 2*

About 107 gms. of crude streptothricin hydrochloride having a potency of about 450 units/mg. is adsorbed on about 1000 gms. of aluminum oxide in the manner described in Example 1, using methanol as a solvent. Methanol is then passed through the column to elute the streptothricin hydrochloride and separate fractions of eluate are collected. The first fraction consisting of about 1 liter of methanol solution is worked up to yield about 43.4 gms. of streptothricin hydrochloride having a potency of 688 units/mg. Similarly, after precipitating and purifying the product obtained from the second liter of methanol solution it is found to yield about 18.9 g. of streptothricin hydrochloride having an activity of about 648 units/mg.

*Example 3*

About 45 gms. of streptomycin hydrochloride having an activity of about 70 units/mg. is adsorbed on about 800 gms. of acid washed alumina and eluted with methanol as described in Example 1. The following table shows the various fractions obtained from this procedure:

| Adsorbate | | Adsorbent | | Filtrate Fractions in Order Taken | | | |
|---|---|---|---|---|---|---|---|
| Weight, g. | Activity, U./mg. | Weight, g. | Type | Vol., Ml. | Weight, g. | Activity, U./mg. | Per Cent of Original Activity |
| 45 | 72. | 800 | Alumina. | 200 | 2.42 | 372 | 28 |
|  |  |  |  | 600 | 9.67 | 154 | 46 |
|  |  |  |  | 2,000 | 8.67 | 113 | 30 |

*Example 4*

In the same manner as shown in Example 1 about 40 gms. of streptomycin hydrochloride having an activity of about 354 units/mg. is adsorbed on about 400 gms. of acid washed alumina and eluted with methanol. The following tabulated data shows the results obtained by this procedure:

| Adsorbate | | Adsorbent | | Filtrate Fractions in Order Taken | | | |
|---|---|---|---|---|---|---|---|
| Weight, g. | Activity, U./mg. | Weight, g. | Type | Vol., Ml. | Weight, g. | Activity, U./mg. | Per Cent of Original Activity |
| 40 | 354 | 400 | Alumina. | 100 | 10.6 | 720 | 54 |
|  |  |  |  | 100 | 7.2 | 538 | 27 |
|  |  |  |  | 200 | 6.0 | 433 | 18 |

*Example 5*

About 17.3 gms. of streptothricin picrate having an activity of about 207 units/mg. (prepared as described in concurrently filed application of Graber and Peck, Serial No. 601,338, filed June 23, 1945) is dissolved in a mixture of methanol and acetone and is adsorbed on about 1095 gms. of acid washed alumina wet with methanol. When the solution of the antibiotic substance is all in the column pure methanol is run into the column in order to spread out the distinctly colored bands which develop. By visual observation it is possible to detect several yellow bands of different intensity. The dark yellow bands which appear approximately ⅓ to ½ the distance down the column is found to contain nearly all of the activity. After developing the bands so that they can be readily distinguished, the residual solvent is removed from the column and adsorbent removed from the column and cut into sections corresponding to the color bands. The deep yellow band half way down the column is taken as fraction #1, and the succeeding yellow band below is taken as fraction #2. Each fraction is eluted with water and the product isolated by freeze-drying under diminished pressure. The following data indicates the activity of the material prepared from these two fractions.

| No. | Fractions | | Per cent of original activity | Activity of the streptothricin hydrochloride obtained from the fraction, Units/mg. |
|---|---|---|---|---|
|  | Weight, g. | Units/mg. |  |  |
| 1 | 3.30 | 222 | 19 | 411 |
| 2 | 5.70 | 240 | 33 | 402 |

*Example 6*

About 2.7 gms. of streptomycin hydrochloride having an activity of about 300 units/mg. is adsorbed on an adsorbent consisting of about 120 gms. of activated charcoal and 20 gms. of filter paper pulp, wet with methanol. The column is then washed with methanol to elute the streptomycin hydrochloride and a number of eluate fractions are collected and treated in the manner described in Example 1. The following tabulated data shows the activity and amount of product obtained in the various fractions from tions obtained from this procedure:

| Adsorbate | | Darco G-60, weight, g. | Filter paper pulp, weight, g. | Vol., ml. | Weight, g. | Activity, U./mg. | Per Cent of Orig. Act. |
|---|---|---|---|---|---|---|---|
| Weight, g. | U./mg. |  |  |  |  |  |  |
| 2.7 | 300 | 120 | 20 | 25 | 0.046 | 650 | 4 |
|  |  |  |  | 25 | 0.092 | 540 | 6 |
|  |  |  |  | 50 | 0.369 | 540 | 25 |
|  |  |  |  | 50 | 0.584 | 500 | 36 |
|  |  |  |  | 500 | 1.090 | 300 | 40 |

*Example 7*

About 4 gms. of streptothricin hydrochloride having an activity of about 49 units/mg. is adsorbed on a mixture of 12 gms. of activated charcoal and 6 gms. of filter paper pulp wet with methanol. When the antibiotic acid salt is all adsorbed the adsorbent is washed with methanol and a number of fractions of eluate are collected and treated as described in Example 1. The following table summarizes the data on the fractions obtained from this procedure:

| Fractions | | Weight of solid, gms. | Activity, Units/mg. | Per cent of Original Activity |
|---|---|---|---|---|
| No. | Vol./ml. | | | |
| 1 | 35 | 0.442 | less than 5 | 0 |
| 2 | 20 | 0.394 | 9 | 2 |
| 3 | 20 | 0.472 | 59 | 14 |
| 4 | 20 | 0.420 | 131 | 28 |
| 5 | 50 | 0.605 | 118 | 37 |
| 6 | 50 | 0.227 | 93 | 11 |
| 7 | 50 | 0.116 | 67 | 4 |
| 8 | 102 | 0.131 | 57 | 4 |
| 9 | 102 | 0.070 | 21 | 1 |
| Total | | | | 101 |

*Example 8*

To a column of about 58 gms. of acid washed alumina 270 mm. in length wet packed with 3:1 methanol-chloroform is added a solution of about 0.46 gm. of streptomycin hydrochloride (activity 208 units/mg.) in 12 cc. of 3:1 methanol-chloroform. The streptomycin hydrochloride is distributed through the column of adsorbent by washing the column with about 175 cc. of 3:1 methanol-chloroform and then with about 200 cc. of about 7:1 methanol-chloroform. The adsorbent is then removed from the column, divided into four portions and each portion is extracted with water. The aqueous extracts are then concentrated to small volume and solid residues are obtained by freeze-drying. The following table summarizes the data on the residue obtained by this procedure:

| Portion of Column mm. | Residue, mg. | Activity, U./mg. |
|---|---|---|
| Upper 40 | 53.2 | 350 |
| Next 30 | 111.2 | 200 |
| Next 100 | 155.8 | 392 |
| Lower 100 | none | |

*Example 9*

About 1 gm. of streptomycin hydrochloride having an activity of about 200 units/mg. in 50 cc. of methanol is adsorbed on a column of about 50 gms. of acid washed alumina wet packed with methanol. The streptomycin hydrochloride is then distributed through the column with 100 cc. of methanol and is then eluted with mixtures of water and methanol and a number of fractions of eluate are collect, concentrated, and dried. The following table summarizes the data on the fractions obtained from this procedure:

| Fractions | | Eluent, H₂O-MeOH | Residue, mg. | Activity, U./mg. |
|---|---|---|---|---|
| No. | Vol./cc. | | | |
| 1 | 100 | 1:19 | 12.2 | 350 |
| 2 | 100 | 1:19 | 138.1 | 320 |
| 3 | 100 | 1:9 | 143.8 | 220 |
| 4 | 100 | 1:9 | 102.5 | 275 |
| 5 | 100 | 1:3 | 142.3 | 175 |
| 6 | 100 | 1:3 | 70 | 150 |
| 7 | 100 | 1:1 | 72 | 65 |
| 8 | 100 | 1:1 | 33 | 25 |
| 9 | 250 | 1:0 | 115 | 25 |

*Example 10*

About 4 gms. of streptomycin hydrochloride having an activity of about 127 units/mg. is dissolved with heating in the mixture of 45 cc. of methanol and 5 cc. of ethanol and added to a column of about 120 gms. of activated charcoal and 12 gms. of filter paper pulp wet packed with a mixture of 50% ethanol-methanol. The adsorbed streptomycin hydrochloride is then eluted with 50% methanol-ethanol and a number of fractions of eluate are collected, concentrated and dried. The following table summarizes the data on the fractions obtained from this procedure:

| Fractions | | Residue, Weight, gm. | Activity, U./mg. |
|---|---|---|---|
| No. | Vol./ml. | | |
| 1 | 25 | 0.280 | 450 |
| 2 | 25 | 0.440 | 310 |
| 3 | 50 | 0.690 | 190 |
| 4 | 50 | 0.720 | 150 |
| 5 | 500 | 0.460 | 88 |

It will be understood that concentrated fractions or combinations of fractions obtained in the foregoing examples can be again adsorbed and eluted in the manner described to produce additional fractions of high potency product. It will also be understood that when operation of an adsorbent column of certain size has been standardized for a certain antibiotic acid salt and solvent, the number of fractions of eluate collected can be limited to two or three critical fractions, viz. a fraction of maximum potency, combined fractions of relatively high potency and suitable for further treatment, and fractions of low potency which it is not practical to process further.

Modifications may be made in carrying out the present invention without departing from the spirit and scope thereof and the invention is to be limited only by the appended claims.

What is claimed is:

1. The process for purifying a crude antibiotic acid salt of the class consisting of hydrochlorides of the water soluble basic Actinomyces elaboration products streptomycin and streptothricin, that comprises adding a methanolic solution of the antibiotic acid salt to a column of adsorbent material selected from the group consisting of acid washed alumina and activated charcoal, washing the column with a methanolic solvent to develop in the column zones of adsorbent material containing the antibiotic acid salt in differing amounts and differing degrees of purity, and selectively recovering the antibiotic acid salt from said zones of adsorbent material by elution with a methanolic solvent.

2. The process for purifying streptomycin hydrochloride that comprising adding a methanolic solution of streptomycin hydrochloride to a column of adsorbent selected from the group consisting of acid washed alumina and activated charcoal, washing the column with a methanolic solvent to develop in the column zones of adsorbent material containing streptomycin hydrochloride in differing amounts and differing degrees of purity, and selectively recovering the streptomycin hydrochloride from said zones of adsorbent material by elution with a methanolic solvent.

3. The process as defined in claim 2 wherein the methanolic solvent is methanol.

4. The process as defined in claim 2 wherein the methanolic solvent is 1:1 methanol:ethanol.

5. The process as defined in claim 2 wherein the eluting solvent is a methanol-water mixture containing 3 to 19 parts of methanol to each part of water.

6. The process for purifying streptothricin hydrochloride that comprises adding a methanolic solution of streptothricin hydrochloride to a column of adsorbent selected from the group consisting of acid washed alumina and activated charcoal, washing the column with a methanolic solvent to develop in the column zones of adsorbent material containing streptothricin hydrochloride in differing amounts and differing degrees of purity, and selectively recovering the streptothricin hydrochloride from said zones of adsorbent material by elution with a methanolic solvent.

ROBERT L. PECK.

REFERENCES CITED

The following references are of record in the file of this patent:

UNITED STATES PATENTS

| Number | Name | Date |
|---|---|---|
| 2,378,876 | Waksman | June 19, 1945 |
| 2,501,014 | Wintersteiner et al. | Mar. 21, 1950 |

OTHER REFERENCES

Lancet, August 16, 1941; pp. 177–179.

Manufacturing Chemist and Manufacturing Perfumer, Aug. 1943; pp. 251–254.

British Journal of Experimental Pathology, June 1942; pp. 103–107.

Journal Bacteriology, vol. 46; Sept. 1943; pp. 299, 300.

Proceedings of Society of Experimental Biology and Medicine, vol. 49, pp. 207–210 (1942); vol. 55, pp. 66–69 (1944).

Carter et al.: J. Biol. Chem., v. 160 (Sept. 1945), pp. 337–342, 6 pages.

Science, vol. 101, June 15, 1945, pages 613 to 615.

Zechmeister et al.: "Chromatography" (John Wiley, New York, 1941), pp. 10 and 79–88.

Strain: "Chromotagraphic Adsorption Analysis (Interscience Publishers, New York, 1942), pp. 12, 13 and 71–76.